(12) United States Patent
Winter (10) Patent No.: US 8,734,570 B2
(45) Date of Patent: May 27, 2014

(54) PRESSURE AND VACUUM SWING ADSORPTION SEPARATION PROCESSES

(75) Inventor: Paul M. Winter, Califon, NJ (US)

(73) Assignee: Wintek Corporation, Flanders, NJ (US)

( * ) Notice: Subject to any disclaimer, the term of this patent is extended or adjusted under 35 U.S.C. 154(b) by 128 days.

(21) Appl. No.: 13/159,655

(22) Filed: Jun. 14, 2011

(65) Prior Publication Data

US 2012/0090465 A1 Apr. 19, 2012

Related U.S. Application Data

(60) Provisional application No. 61/392,503, filed on Oct. 13, 2010.

(51) Int. Cl.
*B01D 53/047* (2006.01)

(52) U.S. Cl.
USPC ............................................. 95/97; 95/122

(58) Field of Classification Search
USPC ............... 95/96, 97, 104, 117, 121, 122, 148; 34/80, 472, 473
See application file for complete search history.

(56) References Cited

U.S. PATENT DOCUMENTS

| | | | | |
|---|---|---|---|---|
| 3,398,208 A | * | 8/1968 | Ward ............................. | 585/824 |
| 4,093,429 A | | 6/1978 | Siegler et al. | |
| 4,273,621 A | | 6/1981 | Fornoff | |
| 4,351,732 A | * | 9/1982 | Psaras et al. .................. | 210/689 |
| 4,405,343 A | * | 9/1983 | Othmer ........................... | 95/105 |
| 4,487,614 A | * | 12/1984 | Yon ................................... | 95/93 |
| 4,556,460 A | | 12/1985 | Robertson et al. | |
| 4,687,498 A | | 8/1987 | Maclean et al. | |
| 4,696,720 A | | 9/1987 | Kiser | |
| 4,726,818 A | * | 2/1988 | Yeung et al. ..................... | 95/124 |
| 4,846,852 A | * | 7/1989 | Schweitzer et al. ............ | 95/125 |
| 4,926,643 A | | 5/1990 | Johnston | |
| 4,948,391 A | | 8/1990 | Noguchi | |
| 4,964,888 A | | 10/1990 | Miller | |
| 4,971,606 A | | 11/1990 | Sircar et al. | |
| 5,335,426 A | | 8/1994 | Settlemyer et al. | |
| 5,503,658 A | | 4/1996 | Zarchy et al. | |
| 5,917,078 A | | 6/1999 | Battista et al. | |
| 5,985,003 A | | 11/1999 | Hayashi et al. | |
| 6,098,425 A | | 8/2000 | Stothers | |
| 6,506,234 B1 | | 1/2003 | Ackley et al. | |
| 6,605,136 B1 | | 8/2003 | Graham et al. | |

(Continued)

FOREIGN PATENT DOCUMENTS

| | | |
|---|---|---|
| WO | 2005/118126 A1 | 12/2005 |
| WO | 2008/079858 A1 | 7/2008 |
| WO | 2008/089527 A1 | 7/2008 |

OTHER PUBLICATIONS

Anderson, R.A., Molecular Sieve Adsorbent Applications State of the Art, Molecular Sieves-II, Chapter 53, 637-649, ACS Symposium Series 40 (1977) (abstract only).

(Continued)

*Primary Examiner* — Frank Lawrence, Jr.

(74) *Attorney, Agent, or Firm* — Charles N. Quinn; Fox Rothschild LLP (57) ABSTRACT

A pressure or vacuum swing adsorption process for separating water from solvent utilizing molecular sieves and regenerating the molecular sieve by passing non-condensable recycled gas along the molecular sieve, capturing the recycled gas and using the recycled gas again to repeat regeneration of the molecular sieve.

10 Claims, 2 Drawing Sheets

(56) References Cited

U.S. PATENT DOCUMENTS

| | | |
|---|---|---|
| 2008/0148718 A1 | 6/2008 | Hermansson et al. |
| 2008/0202337 A1 | 8/2008 | Taylor et al. |
| 2008/0207959 A1 | 8/2008 | Plante et al. |
| 2008/0209892 A1 | 9/2008 | Post et al. |
| 2009/0107331 A1 | 4/2009 | Urakami |
| 2009/0301970 A1 | 12/2009 | Noel |
| 2010/0083829 A1* | 4/2010 | Moura et al. .................. 95/23 |

OTHER PUBLICATIONS

Knaebel, K. S., A "How to" Guide for Adsorber Design, Adsorption Resaerch, Inc., undated (26 pages).

LeVan, M.D. et al., Adsorption and Ion Exchange, Section 16, undated (66 pages).

Mahle, J.J. et al., Pressure Swing Adsorption for Air Purification. 1. Temperature Cycling and Role of Weakly Adsorbed Carrier Gas, Ind. Eng. Chem. Res. 35(7), 2342-2354 (1996) (abstract only).

Ortmann, R.A. et al., Shipboard Gas Generation Using Molecular Sieves, Naval Engineers Journal, 97: 58-63 (1985) (abstract only).

Ruthven, D.M. et al., Air Separation by Pressure Swing Adsorption, Gas Separation & Purification 4(3), 1410-148 (1990).

Ruthven. D. et al., Pressure Swing Adsorption, VCH Publishers, 1994.

Trent, R.E., Dehydration with Molecular Sieves Fundamentals of Molecular Sieve Design, ZEOCHEM publication of Apr. 19, 1992.

Vinson, D.R., Air Separation Control Technology, Computers and Chemical Engineering 30 (10-12), 1436-1446 (2006).

Wang, A.W. et al., Molecular Sieves as Catalysts for Methanol Dehydration in the LPDME™ Process, Air Products and Chemicals, DE-FC22-95PC93052 (2002).

Wilson, S.J. et al., The Effects of a Readily Adsorbed Trace Component (Water) in a Bulk Separation PSA Process: The Case of Oyxgen VSA, Ind. Eng. Chem. Res. 40(12), 2702-2713 (2001) (abstarct only).

\* cited by examiner

PRESSURE AND VACUUM SWING ADSORPTION SEPARATION PROCESSES

CROSS-REFERENCE TO RELATED PATENT APPLICATION

This application claims the benefit, under 35 USC 119 and 120, of the priority of U.S. Ser. No. 61/392,503 for "Pressure and Vacuum Swing Adsorption Separation Processes", filed 13 Oct. 2010 in the name of Paul M. Winter.

BACKGROUND OF THE INVENTION

1. Field of the Invention

This invention relates to use of molecular sieves in pressure swing adsorption and vacuum swing adsorption processes for dehydrating feedstocks of alcohols and other gases or vapors, and further relates to methods and apparatus for periodically regenerating the molecular sieves for continuing successful practice of the dehydrating processes.

As used herein, the term "vapor" refers to a gas that is easily condensable at normal operating temperatures and pressures, whereas the term "gas" refers to the gaseous phase material that is not readily or ordinarily condensable at conventional operating temperatures and pressures. More specifically, the term "vapors" refers to materials that are condensable to liquid at temperatures from −50° F. to 300° F., and at pressures from as low as 1 mm. absolute to as high as 100 psi gauge.

2. Description of the Prior Art

Presumably relevant patent prior art includes United States published patent applications US 2009/0301970; US 2009/0107331; US 2008/0202337; US 2008/0207959; US 2008/0209892; and US 2008/0148718; U.S. Pat. Nos. 6,605,136; 6,506,234; 6,098,425; 5,985,003; 5,917,078; 5,503,658; 5,335,426; 4,971,606; 4,964,888; 4,948,391; 4,926,643; 4,726,818; 4,696,720; 4,687,498; 4,556,460; 4,487,614; 4,273,621; and 4,093,429; as well as published PCT applications WO 2008/089527; WO 2008/079858; and WO 2005/118126.

Presumably relevant printed non-patent prior art includes the publications *Shipboard Gas Generation Using Molecular Sieves,* Ortmann, LCdr. Robert A., USN, Woerner, Joseph A., *Navel Engineers Journal,* Volume 97, Issue 1, p. 58-63, Published Online: 18 Mar. 2009; *Air Separation Control Technology,* Vinson, David R., *Computers & Chemical Engineering,* Volume 30, Issues 10-12, September 2006, pp. 1436-1446; *Molecular Sieves as Catalysts for Methanol Dehydration in the LPDME™ Process,* Wang, Andrew W., Weigel, Scott and Muraro, Giovanni, *Air Products and Chemicals,* Inc., DE-FC22-95PC93052, April 2002; *The Effects of a Readily Adsorbed Trace Component (Water) in a Bulk Separation PSA Process: The Case of Oxygen VSA,* Wilson, Simon J., Beh, Chris C. K., Webley, Paul A., and Todd, Richard S., *Ind. Eng. Chem. Res.,* 2001, 40 (12), pp. 2702-2713; *Sour Gas Dehydration Technology and Alternatives,* Blachman, Marc, Presented at the LRGC, Feb. 27-Mar. 1, 2000, Norman, Oklahoma; *Pressure Swing Adsorption for Air Purification. 1. Temperature Cycling and Role of Weekly Adsorbed Carrier Gas,* Friday, David K., *Ind. Eng. Chem. Res.,* 1996, 35 (7), pp. 2342-2354; *Air Separation by Pressure Swing Adsorption,* Ruthven, D. M. and Farooq, S., *Gas Separation & Purification,* Volume 4, Issue 3, September 19090, pp. 141-148; *Molecular Sieve Adsorbent Application State of the Art,* Anderson, R. A., *Molecular Sieves-II,* Chapter 53, pp. 637-649, ACS Symposium Series, Vol. 40, 1977; *Molecular Sieves for Alcohol Drying,* R. E. Trent, a ZEOCHEM undated publication; ZEOCHEM undated Technical Publication entitled *Dehydration with Molecular Sieves Fundamentals of Molecular Sieve Design,* R. E. Trent Apr. 19, 1992; and Ruthven et al. *Pressure Swing Adsorption,* V C H Wiley, 1994.

Applicant believes the closest of these references to be WO 2008/089527, which has been published as United States published patent application 2010/0083829, and the R. E. Trent paper and text noted in the preceding sentence. The '527 reference discloses use of pressure swing adsorption with molecular sieves to produce anhydrous alcohol and reveals a number of different arrangements of apparatus to accomplish this result. However, there does not appear to be any recognition in the references of the problem of regenerating the adsorbent molecular sieves other than the conventional approach of using a stream of purified alcohol vapor.

Pressure and vacuum swing adsorption molecular sieves are useful in dehydrating alcohols and other gases or vapors. Molecular sieves used in these processes, on which the water adsorbs out of the gas passing along the molecular sieves, require periodic regeneration in order for the molecular sieves to continue to function.

Known commercial practice for producing dehydrated alcohol uses a portion of the dehydrated alcohol, namely up to forty percent (40%) of it, in a vapor state as a purge gas to periodically regenerate the molecular sieves. The resulting condensate, namely the mixture of the dehydrated alcohol vapor purge gas and water resulting from the regeneration of the molecular sieves, is either discarded as waste or is recycled back into an alcohol distillation column upstream for reprocessing. Such reprocessing is energy-intensive.

SUMMARY OF THE INVENTION

This invention provides an improvement over existing commercially-practiced molecular sieve pressure swing adsorption and vacuum swing adsorption water removal techniques, for feedstocks of alcohol and other liquids, gases and vapors requiring to be dried, particularly in the regeneration of the molecular sieves. The invention preferably uses substantially closed loop recycling of a non-condensable purge gas, most preferably nitrogen and less preferably air or the non-aqueous part of the feedstock, to regenerate the molecular sieves. A recycled, non-condensable gas, preferably nitrogen, is preferably provided as the purge gas at low absolute pressure to regenerate the molecular sieves by removing water that has adsorbed on the surfaces of the molecular sieves; the purge gas passes through the molecular sieves preferably in the opposite direction from the original feedstock, such as alcohol-water vapors for example, during the adsorption step. The invention utilizes recycle gas and can do so because the invention regenerates the molecular sieves at lower absolute pressure than conventional molecular sieve dewatering systems, so that the partial pressure of any water in the recycle purge gas is very low. Using this approach, the operating pressure range for regeneration is lower than for conventional molecular sieve pressure swing adsorption and vacuum swing adsorption processes that remove water from alcohol or from other solvents or vapors needing to be dried.

The invention heats the non-condensable gas, which is preferably nitrogen, preferably utilizing a heat exchanger operating either at atmospheric pressure or at a vacuum, preferably using the hot, dry alcohol vapor or other de-watered liquid or vapor feedstock exiting from the molecular sieves. The hot, dry alcohol vapor or other de-watered feedstock is preferably used as the heat source in the heat exchanger, to heat the non-condensable gas, which preferably is nitrogen, for energy savings. The heated non-condensable preferable nitrogen gas is preferably then expanded to perform the regeneration. The preferable nitrogen gas is preferably supplied at low absolute pressures as the purge gas to be furnished to the molecular sieves. The preferable nitrogen purge gas passes through the molecular sieves during the regeneration cycle, extracting water from the molecular sieves. Thereafter the resulting mixture of water vapor and nitrogen is preferably passed through a condenser at approximately the same pressure as the regeneration pressure in the molecular sieve, and then through a pump that cools and compresses the nitrogen to essentially atmospheric pressure. The nitrogen is then heated and expanded to low absolute pressure, thereby completing the cycle in an essentially closed loop.

In a second embodiment, if it is desired to provide even drier non-condensable gas, preferably nitrogen, to perform regeneration of the molecular sieves, a second set of molecular sieves, operating as a smaller vacuum swing adsorption molecular sieve system, may preferably be used to remove additional water from the non-condensable gas, such as the preferable nitrogen, with this set of molecular sieves preferably operating in unison with the regeneration of the primary molecular sieves. With the second set of molecular sieves, operating as a smaller vacuum swing adsorption molecular sieve system, an extraordinarily high dryness level of dehydrated feedstock results, namely on the order of 99.9% dry.

In one of its aspects, this invention provides a pressure or vacuum swing adsorption process for separating water from feedstocks such as alcohol or other liquids or vapors by passing a heated vaporized water- vapor mixture along a molecular sieve so that water is adsorbed on the surface of the molecular sieve, capturing the dehydrated liquid or gas after passage of the mixture along the surface of the molecular sieve, and then regenerating the molecular sieve by passing a dry non-condensable gas along the molecular sieve at low absolute pressure to remove adsorbed water from the molecular sieve.

In another one of its aspects, this invention provides a pressure or vacuum swing adsorption process, and apparatus for practice of the same, for separating water from feedstocks such as alcohol or other liquids or gases by passing a first portion of a heated feedstock containing water and being in either liquid or vapor phase along a first molecular sieve thereby permitting water to be adsorbed on the surface of the first molecular sieve and capturing the now dried feedstock liquid or vapor while passing a first portion of non-condensable recycle gas along a second molecular sieve at low absolute regeneration pressure to regenerate the second molecular sieve by removing adsorbed water therefrom, and then repeatedly reversing the roles of the first and second molecular sieves. The invention further embraces, while the process set forth in the preceding sentence is performed, recirculating the non-condensable recycle gas along the first and second molecular sieves in the course of sequentially repeating the steps described in the preceding sentence.

In still another one of its aspects, the invention provides a pressure or vacuum swing adsorption process for separating water from feedstocks including alcohol vapors or other gaseous mixtures, by passing a first portion of a heated vapor phase feedstock mixture along a first molecular sieve, thereby permitting water to be adsorbed on the surface of the first molecular sieve and capturing the now dry feedstock vapors while passing non-condensable recycle gas along a second molecular sieve at low absolute regeneration pressure to regenerate the second molecular sieve by removing adsorbed water therefrom. In this aspect, the invention proceeds by passing a second portion of the heated dried alcohol vapor or other gaseous mixture along the second molecular sieve thereby permitting water to be adsorbed on the surface of the second molecular sieve and capturing the now dry alcohol vapor or other gaseous mixture while passing non-condensable recycle gas along the first molecular sieve at a low absolute regeneration pressure to regenerate the first molecular sieve by removing adsorbed water therefrom. In this aspect, the invention further proceeds by passing the non-condensable recycle gas along an alternatingly selected one of third and fourth molecular sieves to dry the recycle gas, while regenerating the remaining one of the third and fourth molecular sieves, prior to recirculation of the recycle gas along the first and second molecular sieves in the course of sequentially repeating the steps recited in the two preceding sentences above.

While the invention may be used to dehydrate many solvents and other vapors using the pressure swing adsorption and vacuum swing adsorption molecular sieve approach, the invention as disclosed and described herein focuses on dehydrating or de-watering alcohols. While the invention has principal applicability to de-watering alcohols, the invention is not limited to de-watering alcohols. Other solvents, in addition to alcohols, to which the invention is applicable include ketones such as acetone, acetates such as methyl acetate, straight chain hydrocarbons such as pentane, benzene groups, toluene, xylenes, nitriles such as acetonirile, ethers and cyclic ethers such as tetrahydrofurans, amines such as butyl amines, nitrogen compounds such as dimethyl formamide, cyclic hydrocarbons such as cyclohexane, and other solvents.

In general, adsorption of water improves when performed at higher pressure. Adsorption of the water also improves at lower temperature. Using a pressure swing adsorption or vacuum swing adsorption system such as disclosed herein, the alcohol or other solvent or vapor that is to be dried must be maintained in a gaseous state while passing through the molecular sieve.

To vaporize any liquid, including liquids to be dehydrated using the invention, the temperature of the liquid must be increased until the liquid vaporizes at the desired operating pressure. The operating pressure and temperature for dehydration of a vapor depends on the specific alcohol or chemical to be dehydrated. In the course of operation of the invention, the vapor to be dehydrated should be at least somewhat superheated, namely should be at a temperature above the vaporization temperature for the particular pressure at which it is desired to operate the molecular sieve.

For example, methanol at atmospheric pressure, namely 14.7 psia, has a vaporization temperature of 150° F. At 2.0 psia, the vaporization temperature for methanol is 70° F. and at 50 psia, the vaporization temperature of methanol is 210° F. Accordingly, if the molecular sieve of the invention is to be used to dry methanol and is to operate at 50 psia, the methanol must be heated to a temperature above 210° F. to be certain that the methanol entering the molecular sieve is in the vapor phase.

Adsorption onto a molecular sieve has a similar equilibrium curve to that of the vapor pressure curve of a pure liquid.

The equilibrium curve for water on a molecular sieve at a given temperature is a function of the partial pressure of the water. If the gas supplied is 100% water, namely pure water in a vapor phase, then the partial pressure is the operating pressure. However, if the gas or vapor supplied to the molecular sieve is a mixture, then by Dalton's Law of Partial Pressures the partial pressure is equal to the mole fraction of the vapor multiplied by the total operating pressure. Hence, if the total pressure is 50.0 psia and the water is only 5 mole percent of the gas being supplied, then the partial pressure of the water is 0.05×50.0 psia=2.5 psia. However, if the total pressure of the gas being supplied is 5.0 psia, the partial pressure of the water is 0.05×5.0 psia=0.25 psia. If the total pressure of the gas being supplied is only 2.0 psia, then the partial pressure of the water in the gas being supplied is 0.05×2.0 psia=0.1 psia.

If there is a constant temperature, for example 212° F., the molecular sieve equilibrium curve determines how much water will be adsorbed at equilibrium at a particular partial pressure. For a gas being supplied with 5 mole percent water at 2.5 psia, the molecular sieve will adsorb approximately 11 pounds of water for each 100 pounds of molecular sieve. If one operates the molecular sieve at 50 psia and supplies a water-alcohol vapor mixture having 5 mole percent water and the mixture being at 212° F., at equilibrium the molecular sieve will hold 18 pounds of water for each 100 pounds of molecular sieve. However, if the pressure is 5.0 psia by the equilibrium curve, the molecular sieve will hold 14 pounds of water for each 100 pounds of molecular sieve. If the pressure is 2.0 psia, the equilibrium curve provides that the molecular sieve will hold only about 11 pounds of water per 100 pounds of molecular sieve.

From the foregoing, it is apparent that it is desirable for the pressure swing adsorption system to adsorb at a higher pressure, such as 55.0 psia, to remove water from the gaseous mixture and, when regeneration of the molecular sieve is required, to regenerate the sieve by reducing the pressure during regeneration to 5.0 psia, thereby reducing the water on the molecular sieve.

While not so limited, the invention is particularly concerned with use of molecular sieves in pressure swing adsorption and vacuum swing adsorption processes for removing water from alcohol in the vapor phase and removing water from other vapors.

DESCRIPTION OF THE PREFERRED EMBODIMENTS AND BEST MODE KNOWN FOR PRACTICE OF THE INVENTION

Figure 1:
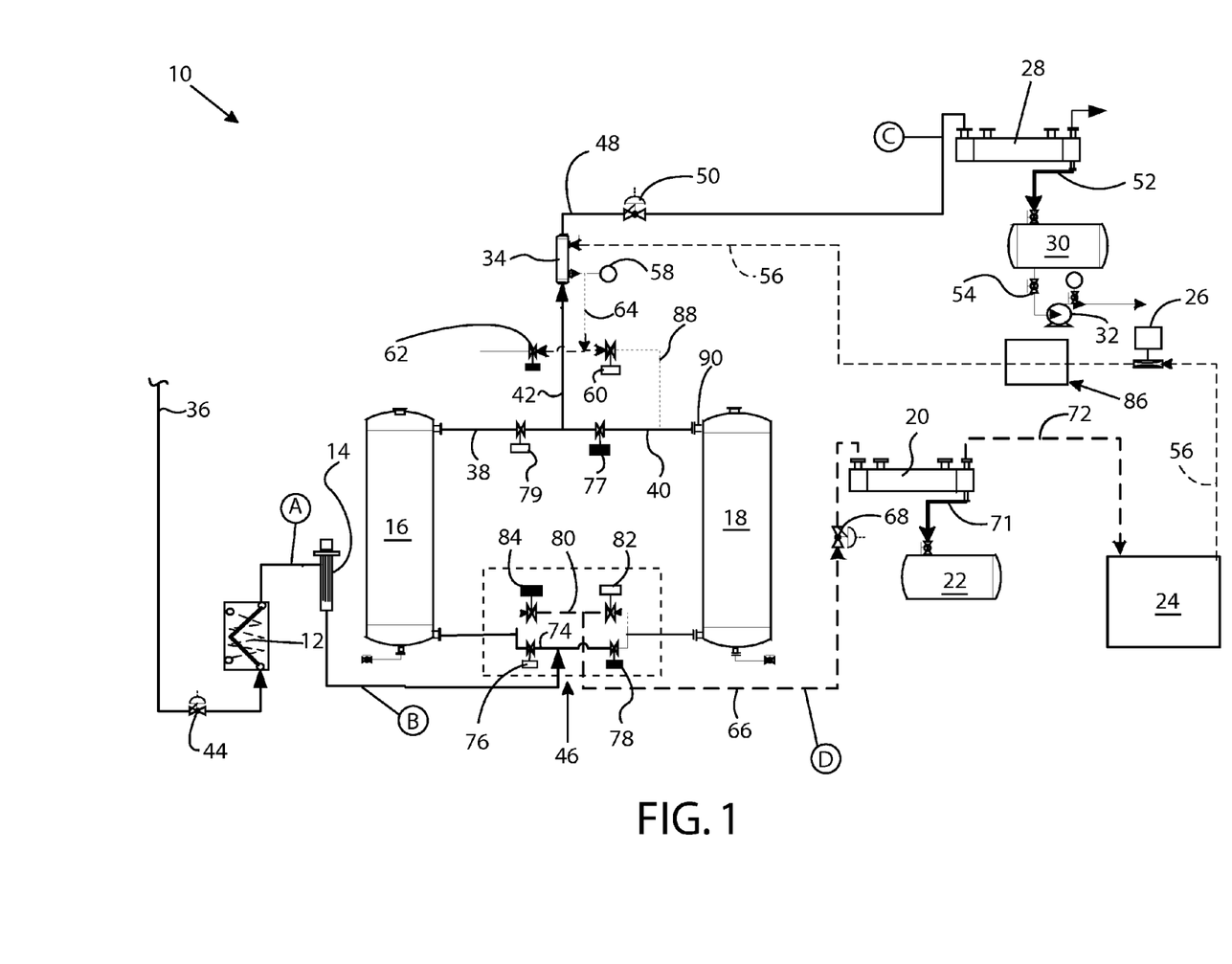
FIG. 1 is a schematic flow diagram of molecular sieve regeneration apparatus in accordance with aspects of the invention.

For clarity and ease of understanding, the following description of molecular sieve regeneration apparatus that is particularly useful in dehydrating alcohols, specifically methanol, ethanol and isopropyl alcohol, as well as other solvents and chemicals in accordance with the invention, is illustrated schematically in FIG. 1.

Referring to FIG. 1, a feedstock, which as noted above for purposes of this detailed description only, shall be considered to be wet alcohol is provided to supply line 36 which supplies wet alcohol to be dried. Wet alcohol supply line 36 connects initially to and effectively may be considered to pass through a flow control valve 44 and into a vaporizer 12; the vaporizer is only required if the wet alcohol feedstock is in liquid phase. Wet alcohol supply line 36 exits vaporizer 12 and leads to a superheater 14. Upon exiting superheater 14 in supply line 36, the wet alcohol is in a gaseous state. Wet alcohol supply line 36 continues to a flow control valving arrangement designated generally 46 comprising a number of valves as described below. Valving arrangement 46 controls supply of gaseous wet alcohol from wet alcohol supply line 36 into either first primary molecular sieve unit 16 or second primary molecular sieve unit 18.

Dried alcohol vapor exits either from first molecular sieve unit 16 via alcohol vapor output line 38 or from second molecular sieve unit 18 via suitable alcohol vapor output lines with alcohol vapor output lines 38 and 40 combining at an unnumbered "T" to form a dried alcohol vapor output line 42 depicted as extending upwardly in FIG. 1. The direction of flow through first and second molecular sieve units 16, 18 can be in either direction, namely either upwardly or downwardly in the drawing. Molecular sieve units 16, 18 can be oriented vertically as shown, horizontally or at angels to the vertical.

Dried alcohol output line 42 supplies the dried alcohol from primary molecular sieve units 16 and 18 to a gas-to-gas heat exchanger 34. The dried alcohol vapor, which is warm due to the adsorption process occurring in the then operative one of the primary molecular sieve units 16 or 18, gives up heat in heat exchanger 34 and then exits heat exchanger 34 via output line 48, passing through pressure control valve 50 as the dried alcohol vapor travels to alcohol condenser 28 in which the alcohol condenses from the gaseous state to a liquid.

The condensed dry liquid alcohol exits condenser 28, traveling through line 52 to alcohol receiver tank 30.

While first primary molecular sieve unit 16 is adsorbing moisture out of the wet alcohol vapor being supplied to first primary molecular sieve unit 16 by wet alcohol supply line 36, and while the dried alcohol is exiting first primary molecular sieve unit 16 and traveling though alcohol output line 38, second primary molecular sieve unit 18 is being regenerated. Similarly, while second primary molecular sieve unit 18 is drying alcohol passing therethrough as supplied to unit 18 by wet alcohol supply line 36, first primary molecular sieve unit 16 is being regenerated.

Regeneration gas, preferably nitrogen, is supplied in a closed loop from a vacuum system designated generally 24 in FIG. 1. The regeneration gas is supplied by vacuum system 24 via regeneration gas supply line 56 and passes through a flowmeter 26 as the regeneration gas travels towards gas-to-gas heat exchanger 34.

Preferably provided intermediate of vacuum system 24 and gas-to-gas heat exchanger 34 is a secondary molecular sieve system for dehydrating the recycle gas that is eventually supplied to one of the primary molecular sieve units 16 or 18 for alternating, cyclic regeneration of those units. The secondary molecular sieve system is designated generally 86 in FIG. 1, where it is depicted in schematic block diagram form, is illustrated in greater detail in FIG. 2, and is described with respect to FIG. 2 below. Regeneration gas supply line 56 and the other lines forming a part of the system for regenerating primary molecular sieves 16, 18 are illustrated in dotted lines in the drawing to distinguish the regeneration gas supply lines from the lines that carry the feedstock alcohol, both when the alcohol is wet and after the alcohol has been dried.

Exiting gas-to-gas heat exchanger 34, the regeneration gas, which has been heated in exchanger 34, travels through regeneration gas input conduit 64 to an unnumbered "T" at which input conduit 64 splits. Ball valves 60, 62 permit or block flow of the regeneration gas into second and first molecular sieve units 18, 16, respectively, according to which one of these molecular sieve units is undergoing regeneration.

The regeneration gas exits either one of first and second molecular sieve units 16, 18 at the opposite end (in the FIG. 1 drawing, at the bottom thereof), as controlled by flow control valving arrangement 46, flowing through recycle gas outlet conduit 66, through flow control valve 68 and into regeneration gas water condenser 20.

Referring to FIG. 1, flow control valving arrangement 46 comprises an alcohol vapor supply line 74 receiving alcohol vapor via a "T" connection with alcohol supply line 36. Alcohol supply line 74 connects through alcohol supply shutoff valves 76 and 78 to first and second primary molecular sieve units 16 and 18 respectively. Flow control valving arrangement 46 further comprises regeneration gas line 80 having valves 82 and 84 positioned therein to permit or block flow of regeneration gas out of first and second primary molecular sieve units 16, 18 respectively, as desired. Regeneration gas entering regeneration gas line 80 from one of primary molecular sieve units 16 or 18, according to which molecular sieve unit is being regenerated, passes through an open one of valves 82, 84 and from there proceeds through regeneration gas line 80 into regenerated gas outlet conduit 66, traveling through flow control valve 68 and into regeneration gas water condenser 20.

Vacuum system 24 further separates additional water remaining in the regeneration gas entering system 24 via line 72 by compressing and cooling, which works to dry and recycle as necessary the dried, purified, regeneration gas, preferably nitrogen, for regeneration of primary molecular sieve units 16 and 18, with that nitrogen being supplied via regeneration gas supply line 56.

In the drawing, rectangular actuators for the valves that are darkened indicate that the valves associated with that controller are depicted in a closed state; the rectangular actuators for the valves that are not blackened indicate that the valves are open. These valves open and close according to which step in the cycle is being performed.

In the configuration of the system illustrated in FIG. 1, valve 62 is closed as are valve 77, valve 78 and valve 84. Similarly, valves 76, 82, 60 and 79 are open.

Flow of gaseous alcohol coming into the FIG. 1 apparatus via wet alcohol feedstock supply line 36 is controlled by flow control valve 44. The alcohol passes through valve 44 into vaporizer 12 and from there into superheater 14, where the vapor is heated. The gaseous vapor then enters alcohol supply line 74 via the "T" connection between alcohol supply line 74 and wet alcohol supply line 36. Since valve 76 is open while valve 78 is closed, vaporous alcohol travels to the left in FIG. 1, through open valve 76 and into first primary molecular sieve unit 16. Vaporous alcohol then travels through the first molecular sieve unit 16, with the three angstrom (3 Å) molecular sieve in first primary molecular sieve unit 16 adsorbing water out of the vaporous alcohol.

When the alcohol, having been substantially dried by contact with the molecular sieve in first primary molecular sieve unit 16, reaches the end of unit 16, the alcohol exits first primary molecular sieve unit 16 via alcohol vapor output line 38, passes through valve 79, and then travels through dried alcohol vapor output line 42, because valve 77 blocks flow of alcohol vapor into second primary molecular sieve unit 18. The vaporous alcohol continues through dried alcohol vapor output line 42, passing through gas-to-gas heat exchanger 34, where it gives up heat to the regeneration gas that enters gas-to-gas heat exchanger 34 from regeneration gas supply line 56.

The now dried and somewhat cooled alcohol vapor continues through output line 48, passing through flow control valve 50 and enters alcohol condenser 28 where the alcohol is condensed and flows in liquid form through line 52 into alcohol receiving tank 30, from where it may be pumped by pump 32 to a user or to an inventory station.

Meanwhile, regeneration gas, after exiting secondary molecular sieve system 86, continues flowing through regeneration gas supply line 56 and enters gas-to-gas heat exchanger 34. After receiving heat from the dried alcohol while within gas-to-gas heat exchanger 34, the regeneration gas exits gas-to-gas heat exchanger 34 as illustrated in FIG. 1, traveling through regeneration gas input conduit 64 in FIG. 1 towards the primary molecular sieve units 16 and 18. Regeneration gas input conduit 64 then splits at a "T", not numbered in FIG. 1, and connects to valves 60 and 62. Since in the configuration illustrated in FIG. 1 valve 62 is closed and valve 60 is open, the recycle gas passes through valve 60, through a recycle gas line 88 and into a line 40 connected to an alcohol output port 90 from second primary molecular sieve unit 18. Line 40, illustrated in FIG. 1, allows flow of the regeneration gas into second primary molecular sieve 18 because valve 76 is closed as indicated by the darkened rectangular actuator symbol in FIG. 1.

The regeneration gas flows through second primary molecular sieve unit 18, regenerating the molecular sieve in unit 18 by removing the water that had been adsorbed by the molecular sieve unit 18 as the water migrates into the regeneration gas in vapor form. The regeneration gas then exists second primary molecular sieve unit 18 at the end, passing through open valve 82 to a "T" connection between regeneration gas line 80 and regeneration gas outlet conduit 66, whereupon the regeneration gas, having the water vapor therein, passes through flow control valve 68 and into a regeneration gas water condenser 22, where the water vapor is largely condensed out of the regeneration gas. The regeneration gas then exits regeneration water condenser 20 through regeneration gas outlet line 72 and travels into vacuum system 24 for further drying, repressurizing and recycling, whereupon the cycle may repeat.

Once the molecular sieve in first primary molecular sieve unit 16 has adsorbed the desired or programmed amount of moisture, the valves that had been open and permitting the flow of wet alcohol into first primary molecular sieve unit 16 are closed. The valves that had been closed are substantially simultaneously opened, thereby permitting flow of wet alcohol into second primary molecular sieve unit 18 so that the process may continue with second molecular sieve unit 18 now receiving the wet alcohol and dewatering it by adsorption of the water onto the three angstrom molecular sieve. Simultaneously first primary molecular sieve unit 16 is regenerated by having the regeneration gas flow therethrough as previously described with respect to second primary molecular sieve unit 18.

The regeneration gas enters regeneration water condenser 20 in which water cools the regeneration gas and thereby condenses water vapor out of the regeneration gas into a liquid phase, whereupon the condensed water flows through regeneration gas water condenser output line 70 into regeneration water receiving tank 22.

The cooled regeneration gas flows out of regeneration water condenser 20 through dried regeneration gas outlet line 72 into vacuum system 24.

Temperatures and pressures in the molecular sieve regeneration apparatus, in accordance with the apparatus and method aspects of the invention as illustrated in FIG. 1, can vary based on requirements of the user and may further vary based on the temperature of available cooling water. At position A illustrated in FIG. 1, alcohol pressure is typically between 0 and 75.0 psig while temperature of the alcohol vapor is typically between 200° and 350° F. While these are typical numbers, the gaseous alcohol pressure may be as low as 26 inches of mercury vacuum and as high as 100 psig; in such cases the alcohol temperature at position A illustrated in FIG. 1 would be the saturation temperature of the alcohol after vaporization.

At position B, the gaseous alcohol temperature is typically 25° F. to 100° F. higher than at position A due to the heat imparted to the gaseous alcohol by superheater 14.

At position C, pressure of the dried alcohol in the gaseous phase would typically be 0 psig while temperature of the alcohol would be slightly lower than the temperature at position B.

Pressure of the regeneration gas at position D is typically one and five-tenths (1.5) psia and could range from twenty-five one hundredths (0.25) psia to five (5.0) psia.

First and second primary molecular sieve units 16, 18 are preferably cylindrical in shape, as illustrated generally in FIG. 1, and are preferably filled with three angstrom molecular sieve beads, which are commercially available from W. R. Grace and Company, ZeoChem, Inc., and Hengye, Inc.

During operation of the invention in the preferred embodiment, the cycle time is typically between about 5 and about 20 minutes of adsorption in one of molecular sieve units 16, 18, and between about 4 and about 15 minutes of regeneration, in either of molecular sieve units 16, 18, with the result being that the water adsorbed on the molecular sieve bed in one of the primary molecular sieve units 16 or 18 is quite small, typically only in the range of about 5 weight percent.

Timing of the adsorption cycle and the regeneration cycle is controlled and adjusted by the user. Control of the valves regulating and adjusting flow of alcohol and regeneration gas may be by electrical or pneumatic means. Such control lines have not been shown and the valve controllers have only been shown selectively, to enhance drawing clarity.

Suitable flow control valves such as 44, 50 and 54 are commercially available from Fisher Controls International LLC. Flow transmitters positioned throughout the system, which are not shown in the drawing to ensure drawing clarity, are used to regulate the flow control valves.

Valves such as 60, 62, and the valves used in flow control valving arrangement 46, are commercially available from Velan, Inc.

Figure 2:
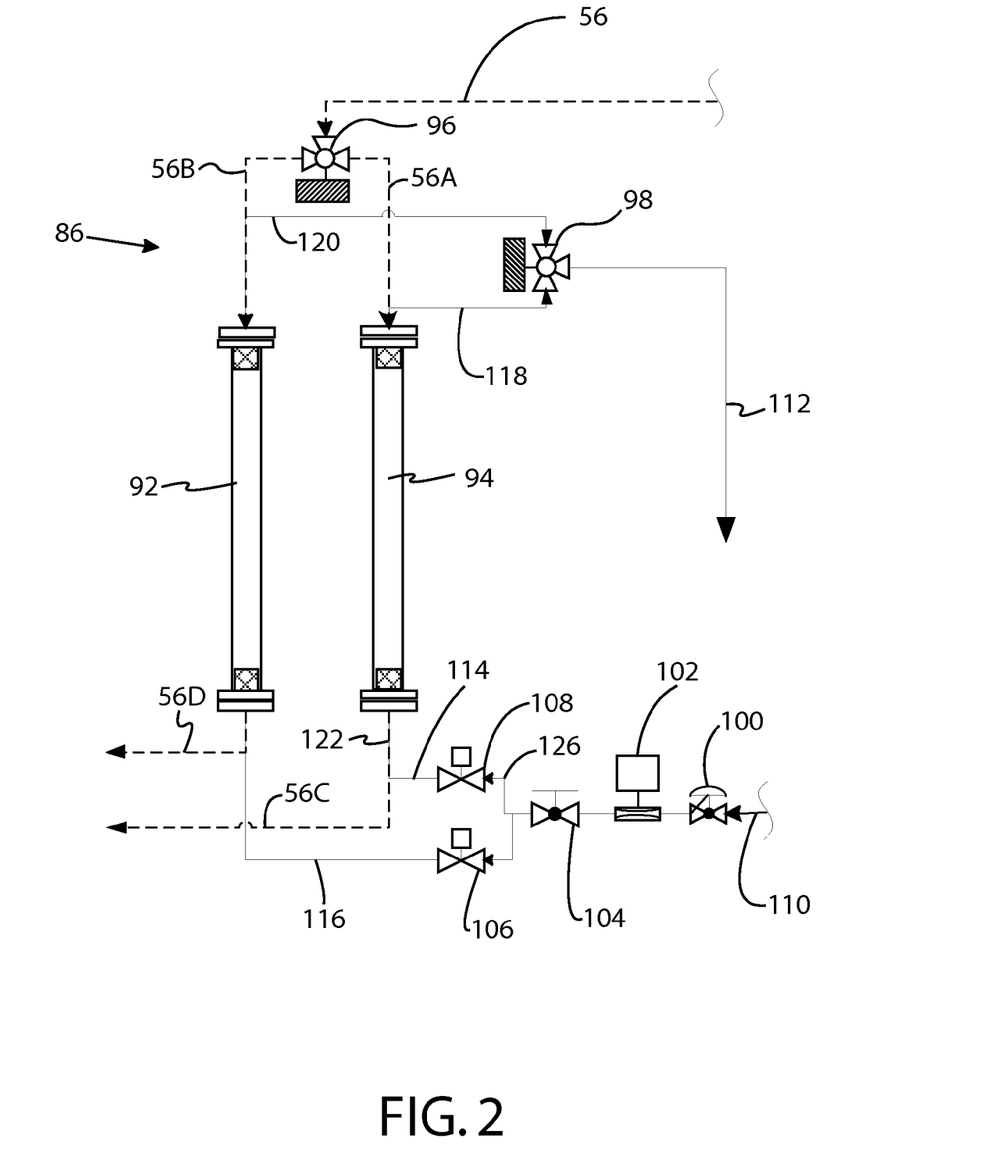
FIG. 2 is a schematic flow diagram of secondary molecular sieve regeneration apparatus that preferably is a part of the molecular sieve regeneration apparatus schematically illustrated in FIG. 1.

The secondary molecular sieve system designated generally 86 is illustrated in FIG. 2 and includes first and second recycle molecular sieve units designated 92 and 94 respectively; three-way ball valves designated 96 and 98 respectively; a valve designated 100; a flowmeter designated 102; valves designated 104, 106 and 108 respectively; and conduit lines designated 110, 112, 114, 116, 118 and 120 interconnecting the various parts of the secondary molecular sieve system.

As respecting secondary molecular sieve system 86, recycle gas is supplied by line 56 as indicated by the dotted line and arrowhead for gas input appearing at the top of FIG. 2. The recycle gas is directed by three-way valve 96 either to recycle gas supply line 56A or to recycle gas supply line 56B, according to the setting of three-way valve 96. Assuming three-way valve 96 is set to direct recycle gas into recycle gas supply line 56A, the recycle gas flows through recycle gas supply line 56A into second recycle molecular sieve unit 94 in which the recycle gas is further dried by adsorption of moisture onto a three angstrom (3 A) molecular sieve within second recycle molecular sieve unit 94. The recycle gas in its further dried condition exits second recycle molecular sieve unit 94 at the bottom thereof via conduit 122, which in turn carries flow of the further dried recycle gas into recycle gas supply line 56C, whereupon that line becomes recycle gas supply line 56 as illustrated in FIG. 1 and carries the recycle gas in its further dried condition to gas-to-gas heat exchanger 34 illustrated in FIG. 1.

The further dried recycle gas exiting second recycle molecular sieve unit 94 is constrained to flow into recycle gas supply line 56C and not into regeneration input line 114 due to valve 108 being closed.

While regeneration gas is being further dried by adsorption in the course of travel through second recycle molecular sieve unit 94, first recycle molecular sieve unit 92 may be regenerated. In such case regeneration fluid, which may be air or nitrogen gas but is preferably a small fraction of dried alcohol gas such as from a branch from line 42, is supplied as indicated at input line 110, as input gas for regeneration of first and second recycle molecular sieve units 92, 94 respectively. Gas supplied by input line 110 passes through control valve 100 which is used to control flow of the gas for regeneration of the first and second recycle molecular sieve units 92, 94. The gas then passes through a flowmeter 102 to a second valve 104 and then to a "T" connector 126, whereupon the gas flows either through valve 108 or through valve 106, depending on which of valves 108, 106 is open. If second recycle molecular sieve unit 94 is adsorbing moisture from recycle gas passing therethrough as described above and first recycle molecular sieve unit 92 is being regenerated, valve 108 is closed, but valve 106 is open and regeneration gas flows through regeneration input line 116 to first recycle molecular sieve unit 92. After flowing through first recycle molecular sieve unit 92 and adsorbing moisture from the molecular sieves within unit 92, the regeneration gas exits unit 92 at the upper end thereof, traveling through line 120 to three-way valve 98. Three-way valve 98 is open to allow regeneration gas to pass through output line 112 to a second vacuum pump.

Much like first and second primary molecular sieve units 16, 18, when one of first and second recycle molecular sieve units 92, 94 is adsorbing moisture out of recycle gas passing therethrough, the remaining one of first and second recycle molecular sieve units 92, 94 may be regenerated by passage therethrough of regeneration gas to adsorb moisture off the molecular sieve in the unit being regenerated.

Regeneration of first and second recycle molecular sieve units 92, 94 may be sequenced to coincide with regeneration of first and second primary molecular sieve units 16, 18 or may be accomplished independently thereof.

While the secondary molecular sieve system, designated generally 86 in FIG. 2 has been illustrated with the first and second recycle molecular sieve units 92, 94 disposed as upstanding columns, it is to be understood that the first and second recycle molecular sieve units may be disposed in any orientation. It is not necessary for the recycle gas to flow downwardly through these molecular sieves; the system could just as well be configured in a reverse orientation with the recycle gas flowing upwardly through first and second recycle molecular sieve units 92, 94. It is also entirely within the scope of the invention to position first and second recycle molecular sieve units 92, 94 horizontally for horizontal gas flow therethrough.

The same is true of first and second primary molecular sieve units 16, 18 and the valves and piping associated therewith that provide for switching back and forth of the molecular sieve units between adsorbing moisture out of the alcohol passing therethrough and regeneration of the molecular sieve units to adsorb water off the molecular sieves. Specifically, while first and second primary molecular sieve units 16, 18 have been illustrated in a vertical orientation in FIG. 1, those units could just as well be oriented horizontally for horizontal flow therethrough of both the gaseous alcohol to be dried and the regeneration fluid. Similarly, while first and second primary molecular sieve units 16, 18 have been illustrated in a vertical orientation, with the vaporous alcohol to be dried flowing upwardly therethrough and the regeneration gas flowing downwardly therethrough in FIG. 1, the alcohol flow could be vertically downwards and the regeneration gas could flow vertically upwards. The invention is not limited to the direction of alcohol flow or regeneration gas flow through the first and second primary molecular sieve units.

The apparatus and method of the invention facilitate the retention of all of the heat of adsorption occurring within the molecular sieve beds so that this heat may, upon regeneration, be used to help desorb the water from the molecular sieve bed. Accordingly, the apparatus and method of the invention exhibit much lower energy usage than conventional thermally regenerated molecular sieve units.

One limit in the design of any molecular sieve dehydration unit is the amount of water adsorbed per pound of molecular sieve. Typically isotherms of three angstrom (3 A) mole sieves show that water can be adsorbed to about twenty-two percent (22%) of the weight of the three angstrom (3 A) sieve. Thus, the higher the amount of water to be adsorbed, the more molecular sieve material is required. In this invention, the amount of water adsorbed is much lower than full saturation, in the range of only five percent (5%) by weight.

Three angstrom (3 A) molecular sieve material is primarily, but not completely, size restricted at three angstrom (3 A) diameter pores. Using such molecular sieve material, the two and seven-tenths angstrom diameter water molecules will adsorb, to the exclusion of alcohol (or other solvents) which has much larger molecules. However, sizing of any molecular sieve is not one hundred percent perfect due to manufacturing and other tolerances. Hence there are irregularities in the sieve and there will be some alcohol adsorption so that upon regeneration the removed water will include some alcohol. This amount of alcohol includes the amount that is in the gas phase when switching from the dehydration process to the regeneration process. As the switch occurs, there will be some alcohol remaining, namely some from the gas phase plus the amount that was adsorbed on the three angstrom molecular sieve.

In operation of the invention, purity of the processed alcohol depends on the regeneration step.

While conventional alcohol dehydration units utilize a portion of the dehydrated alcohol, namely somewhere in the neighborhood of ten to forty percent, as a purge gas that is recovered with regenerated water, this condensate is then either discarded as an additional volume of waste or the condensate is then recycled back to a distillation column for reprocessing, with additional energy costs.

The invention uses a different approach. The invention utilizes a recycled non-condensable gas, preferably nitrogen, as the purge gas, then compresses the purge gas to atmospheric pressure or slightly higher, and then uses chilled water to reduce water content of the purge gas to less than about one percent (1%) by volume. The limiting factors for dehydrating gases such as alcohol are the regeneration step and the water content in the regeneration gas. Known alcohol molecular sieve dehydration systems regenerate at about five (5) psia pressure. So in those systems, if nitrogen gas was utilized within a closed loop, as with this invention, the water content of one percent (1%) by volume would equate to a partial water pressure of 0.05 psia. The equilibrium loading on the molecular sieve during regeneration with such a high partial pressure would result in too high a water content during the dehydration step.

In this invention, the recycled gas, with about one percent (1%) by volume of water, is then expanded to a regeneration pressure of around 1.5 psia. The partial pressure of the water in this gas is only about 0.0155 psia (0.8 Torr), which is significantly less than known systems. This lower partial pressure in the purge gas, when run to equilibrium on the molecular sieve at a temperature of two hundred fifty (250° F.) results in an equilibrium loading of about two (2) weight percent. This maximum loading on a final molecular sieve at the adsorbing temperature of 300° F. results in an equilibrium partial pressure of 0.12 psia (6 Torr), but with an operating pressure of 50 psia. This partial pressure equates to approximately 0.2 percent by volume. So the discharged dry alcohol would have a maximum of two-tenths (0.2) percent by volume of water, which is less than thirteen-one hundredths (0.13) percent water by weight.

The limiting factor for better dehydration is the water content in the regeneration gas, which at fifty-five degrees Fahrenheit (55° F.) and fourteen (14.0) psia condensing pressure, at discharge of the regeneration vacuum system, is approximately one (1.0) percent by weight. To guarantee even better dryness, namely ninety-nine and nine-tenths percent (99.9%) dryness by weight, the recycled gases must be further dehydrated, which is one option provided by the apparatus and method of the invention using the second, smaller, molecular sieve system, identified generally as 86 in FIG. 1 and shown in detail in FIG. 2, to dehydrate the regeneration gases.

The second, smaller secondary molecular sieve system illustrated in FIG. 2 includes two molecular sieve vessels, which are much smaller then the primary alcohol drying molecular sieve units 16, 18, because the smaller, secondary molecular sieve system is only dehydrating the much smaller flow of the recycled regeneration gas having a much lower water content therein. The secondary, smaller secondary molecular sieve system piping has valving similar to that provided for first and second primary molecular sieve units 16, 18, to direct the gas flow to one or the other of the two molecular sieve vessels constituting the secondary, smaller molecular sieve system, and also for the control of which vessel is being regenerated. The secondary, smaller molecular sieve units may be sequenced separately from or in unison with the primary alcohol drying molecular sieve units 16, 18. A separate vacuum system is used to regenerate the secondary, smaller molecular sieve system at lower absolute pressure than the primary molecular sieve units, preferably at a pressure less than one-tenth (0.1) psia.

With the secondary, smaller molecular sieve system, recycled gases are not used within the vacuum system 24. Because of the smaller volumetric flow rate required for the molecular sieve purge gas, and the high vacuum required for the regeneration, the purge gas mass flow rate is quite small, and dry alcohol vapor, nitrogen, or compressed air (with a minus forty degree Fahrenheit (−40 F) dew point or lower) can be utilized for the purge gas.

Heat of adsorption is a concern. Water has a heat of adsorption of 1800 BTUs per pound, which is 80% more than the heat of condensation. As the temperature of the gas increases, then the loading of the water on the molecular sieve decreases, and the water moves further down the molecular sieve column. In the method and apparatus of the invention, only a small quantity of water is adsorbed during the process cycle so the total heat of adsorption is not great and any heat generated remains within the primary molecular sieve units. Then, on regeneration of the primary molecular sieve units, which is preferably performed countercurrent to the process flow, heat flow is reversed back towards the wettest part of the primary molecular sieve unit, which aids in the regeneration of the primary molecular sieve unit.

The following prophetic examples further illustrate the invention and operation thereof.

PROPHETIC EXAMPLE 1

A feedstock of 3870 pounds per hour of isopropyl alcohol with 120 pounds of water per hour will be introduced via line 36. At location A, the feedstock is expected to be all vapor at 63 psia and 255° F. After passing through superheater 14, the properties of the feedstock at location B are expected to be all vapor at 62 psia 305° F., which is a flow rate of 148 Actual Cubic Feet per Minute (ACFM). This feedstock will then be fed alternatingly through first and second primary molecular sieve units 16, 18 with the duration of feedstock passage through the operative one of molecular sieve units 16, 18 being 5 minutes. The feedstock exiting the operative one of first and second primary molecular sieve units 16, 18, after passing through gas-to-gas heat exchanger 34 and arriving at location C is expected to exhibit the following properties: 15 psia, 175° F. with approx 80% still vapor, but devoid of water. It is expected that after passing through condenser 28 and through unit 32, 99.5% dry isopropyl alcohol will result, furnished at a production rate of 9.76 gpm.

Regeneration of first and second primary molecular sieve units 16, 18 will be operated with a regeneration time for each unit being 4.5 minutes, with the regeneration gas, namely recycled nitrogen, being supplied via line 64 to first and second recycle molecular sieve units 16, 18 at a temperature, pressure of 2 psia and 200° F. and flow rate of 1.0× the feedstock ACFM or 148 ACFM, which is only 64.8 pounds per hour because of the lower pressure and is expected to be 64.1 pounds per hour nitrogen with 0.6 pounds per hour water and 0.1 pounds per hour isopropyl alcohol.

The regeneration gas, namely recycled nitrogen, being supplied via line 64 and through valves 60 and 62 to first and second primary molecular sieves 16, 18 will be essentially the feedstock gas with respect to first and second primary molecular sieve units 92, 94, at a flow rate of 64.8 pounds per hour. This feedstock will pass thru first and secondary molecular sieve units 92, 94 at 14.7 psia and 55° F. for a volumetric flow of 14.6 ACFM. Regeneration of first and second primary molecular sieve units 92, 94 will occur with a regeneration time for each unit being four and one-half minutes, with the regeneration gas of pure nitrogen or dried alcohol vapors, but typically dried alcohol, being supplied via lines 116, 114 to first and second recycle molecular sieve units 92, 94 at a temperature of 260° F., a pressure of 0.2 psia, a flow rate of 1× feedstock volumetric rate of 14.6 ACFM or 1.8 pounds per hour isopropyl alcohol. First and second recycle molecular sieve units 92, 94 will be alternatingly cycled in sequence with the cycling of first and second primary molecular sieve units 16, 18.

PROPHETIC EXAMPLE 2

A feedstock of 3826 pounds per hour of ethanol with 161 pounds per hour of water will be introduced via line 36. At location A, the feedstock is expected to be all vapor at 63 psia and 250° F. After passing through superheater 14, the feedstock at location B is expected to be all vapor at 62 psia, 300° F., which is a flow rate of 192 Actual Cubic Feet per Minute (ACFM). The feedstock will then be fed alternatingly through first and second primary molecular sieve units 16, 18 with the duration of feedstock passage through the operative one of molecular sieve units 16, 18 being five minutes. The feedstock exiting the operative one of first and second primary molecular sieve units 16, 18, after passing through gas-to-gas heat exchanger 34 and arriving at location C will be expected to exhibit the following properties: 15 psia, 175° F. with approx 80% remaining as vapor, but devoid of water. It is expected that after passing through condenser 28 and through unit 32, 99.5% dry ethanol will result, furnished at a production rate of 9.7 gpm.

Regeneration of first and second primary molecular sieve units 16, 18 will be operated with a regeneration time for each unit being 4.5 minutes, with the regeneration gas, namely recycled nitrogen, being supplied via line 64 to first and second recycle molecular sieve units 16, 18 at a temperature and pressure of 2 psia and 200° F., and a flow rate of 1.0× the feedstock ACFM or 192 ACFM, which is only 85.8 pounds per hour because of the lower pressure, and is expected to be 82.9 pounds per hour nitrogen with 0.8 pounds per hour water and 2.1 pounds per hour ethanol.

The regeneration gas, namely recycled nitrogen, being supplied via line 64 and through valves 60 and 62 to first and second primary molecular sieves 16, 18 is essentially the feedstock gas with respect to first and second primary molecular sieve units 92, 94, at a flow rate of 85.8 pounds per hour. This feedstock will pass through first and secondary molecular sieve units 92, 94 at 14.7 psia and 55° F. for a volumetric flow of 19 ACFM. Regeneration of first and second primary molecular sieve units 92, 94 will occur with a regeneration time for each unit of four and one-half minutes, with the regeneration gas being pure nitrogen or dried alcohol vapor, preferably dried alcohol, being supplied via lines 116, 114 to first and second recycle molecular sieve units 92, 94 at a temperature of 260° F., a pressure of 0.2 psia and a flow rate of 1× feedstock volumetric rate of 19 ACFM or 1.8 pounds per hour ethanol. First and second recycle molecular sieve units 92, 94 will be alternatingly cycled in sequence with the cycling of first and second primary molecular sieve units 16, 18.

PROPHETIC EXAMPLE 3

A feedstock of 3845 pounds per hour of methanol with 202 pounds per hour of water will be introduced via line 36. At location A, the feedstock is expected to be all vapor at 63 psia and 225° F. After passing through superheater 14, the feedstock at location B is expected to be all vapor at 62 psia, 275° F., which is a flow rate of 266 Actual Cubic Feet per Minute (ACFM). The feedstock will then be fed alternatingly through first and second primary molecular sieve units 16, 18 with the duration of feedstock passage through the operative one of molecular sieve units 16, 18 being five minutes. The feedstock exiting the operative one of first and second primary molecular sieve units 16, 18, after passing through gas-to-gas heat exchanger 34 and arriving at location C, is expected to be at 15 psia, 150° F., approximately 80% still vapor, but devoid of water. It is expected that after passing through condenser 28 and through unit 32, 99.5% dry methanol will result, furnished at a production rate of 9.6 gpm.

Regeneration of first and second primary molecular sieve units 16, 18 will occur with a regeneration time for each unit being four and one-half minutes, with the regeneration gas, namely recycled nitrogen, being supplied via line 64 to first and second recycle molecular sieve units 16, 18 at a pressure of 2 psia, a temperature of 200° F., and a flow rate of 1.0× the feedstock ACFM or 266 ACFM, which is only 121.6 pounds per hour because of the lower pressure, and is expected to be 117.8 pounds per hour nitrogen with 1.03 pounds per hour water and 2.8 pounds per hour methanol.

The regeneration gas, namely recycled nitrogen, supplied via line 64 and through valves 60 and 62 to first and second primary molecular sieves 16, 18 is essentially the feedstock gas with respect to first and second primary molecular sieve units 92, 94, at a flow rate of 117.8 pounds per hour. This feedstock will pass thru first and secondary molecular sieve units 92, 94 at 14.7 psia and 55° F. for a volumetric flow of 27.2 ACFM. Regeneration of first and second primary molecular sieve units 92, 94 will occur with a regeneration time for each unit being four and one-half minutes, with the regeneration gas, namely pure nitrogen or dried alcohol vapor, preferably dried alcohol, being supplied via lines 116, 114 to first and second recycle molecular sieve units 92, 94 at a temperature of 260° F., a pressure of 0.2 psia, and a flow rate of 1× feedstock volumetric rate of 27.2 ACFM or 1.8 pounds per hour methanol. First and second recycle molecular sieve units 92, 94 will be alternatingly cycled in sequence with the cycling of first and second primary molecular sieve units 16, 18.

PROPHETIC EXAMPLE 4

A feedstock of 10 gpm ethyl acetate with 5% water weight (4333 pounds per hour ethyl acetate with 228 pounds per hour water) will be introduced via line 36. At location A, the properties of the feedstock are expected to be all vapor at 63 psia and 252° F. After passing through superheater 14, the properties of the feedstock at location B are expected to be all vapor at 62 psia, and 302° F., at a flow rate of 115 ACFM. The feedstock will then be fed alternatingly through first and second primary molecular sieve units 16, 18 with the duration of feedstock passage through the operative one of molecular sieve units 16, 18 being 5 minutes. The feedstock exiting the operative one of first and second primary molecular sieve units 16, 18, after passing through gas-to-gas heat exchanger 34 and arriving at location C is expected to exhibit the following properties: 15 psia, 175° F., with approximately 80% still in the vapor phase, but devoid of water. It is expected that after passing through condenser 28 and through unit 32, 99.5% dry ethyl acetate will result and be furnished at a production rate of 9.5 gpm.

Regeneration of first and second primary molecular sieve units 16, 18 will be performed with a regeneration time for each unit being 4.5 minutes, with the regeneration gas, namely recycled nitrogen, being supplied via line 64 to regenerate first and second molecular sieve units 16, 18 at a temperature and pressure of 2.0 psia and 200° F., and a flow rate of 1.0× the feedstock ACFM or 115 ACFM, which is only 62.5 pounds per hour because of the lower pressure, and upon arriving at location C is expected to be 52.3 pounds per hour nitrogen, with 0.5 pounds per hour water and 9.6 pounds per hour ethyl acetate.

The regeneration gas, namely recycle nitrogen, being supplied via line 64 and through valves 60 and 62 to regenerate first and second primary molecular sieves 16, 18 will be essentially the feedstock with respect to first and second secondary molecular sieve units 92, 94 at a flow rate of 62.5 pounds per hour. This regeneration feedstock will pass through first and secondary recycle molecular sieve units 92, 94 at 14.7 psia and 55° F. for a volumetric flow of 16.7 ACFM. Regeneration of first and second primary molecular sieve units 92, 94 will be performed with a regeneration time for each unit being 4.5 minutes, with the regeneration gas, which may be pure nitrogen or may be dried ethyl acetate vapor, preferably dried ethyl acetate vapor, being supplied via line 116, 114 to first and second recycle molecular sieve units 92, 94 at a temperature of 260° F., a pressure of 0.2 psia, and flow rate of 1× feedstock volumetric rate of 16.7 ACFM or about 5 pounds per hour ethyl acetate. First and second recycle molecular sieve units 92, 94 will be alternatingly cycled in sequence with the cycling of first and second primary molecular sieve units 16, 18.

PROPHETIC EXAMPLE 5

A feedstock consisting of 10 gpm acetone with 4% water weight (3870 pounds per hour acetone with 161 pounds per hour water) will be introduced via line 36. At location A, the properties of the feedstock are expected to be all vapor at 63 psia and 221° F. After passing through superheater 14, the properties of the feedstock at location B are expected to be all vapor at 62 psia and 271° F., which is a flow rate of 147 ACFM. The feedstock will then be fed alternatingly through first and second primary molecular sieve units 16, 18 with the duration of feedstock passage through the operative one of molecular sieve units 16, 18 being 5 minutes. The feedstock exiting the operative one of first and second primary molecular sieve units 16, 18, after passing through gas-to-gas heat exchanger 34 and arriving at location C is expected to exhibit the following properties: 15 psia, 175° F. with approximately 80% still vapor, but devoid of water. It is expected that after passing through condenser 28 and through unit 32, 99.5% dry acetone will result and be furnished at a production rate of 9.7 gpm.

Regeneration of first and second primary molecular sieve units 16, 18 will be with a regeneration time for each unit of 4.5 minutes, with the regeneration gas, namely recycled nitrogen, being supplied via line 64 to regenerate first and second molecular sieve units 16, 18 at a temperature and pressure of 0.2 psia and 200° F., and a flow rate of 1.0× the feedstock ACFM or 147 ACFM, which is only 75 pounds per hour because of the lower pressure, and is expected to be 61.1 pounds per hour nitrogen with 0.6 pounds per hour water and 13.3 pounds per hour acetone.

The regeneration gas, namely recycled nitrogen, being supplied via line 64 and through valves 60 and 62 to first and second primary molecular sieves 16, 18, is essentially the feedstock gas with respect to first and second primary molecular sieve units 92, 94, at a flow rate of 75 pounds per hour. This gas passes thru first and second recycle molecular sieve units 92, 94 at 14.7 psia and 55° F. for a volumetric flow of 15.5 ACFM. Regeneration of first and second primary molecular sieve units 92, 94 will be performed with a regeneration time for each unit being 4.5 minutes, with the regeneration gas, which may be pure nitrogen or may be dried acetone vapor, preferably dried acetone vapor being supplied via lines 116, 114 to first and second recycle molecular sieve units 92, 94 at a temperature of 260° F., a pressure of 0.2 psia, and a flow rate of 1× feedstock volumetric rate of 15.5 ACFM or about 3 pounds per hour of acetone. First and second recycle molecular sieve units 92, 94 will be alternatingly cycled in sequence with the cycling of first and second primary molecular sieve units 16, 18.

PROPHETIC EXAMPLE 6

A feedstock of 10 gpm benzene with 4% water weight (4271 pounds per hour benzene with 178 pounds per hour water) will be introduced via line 36. At location A, the feedstock is expected to be all vapor at 63 psia and 290° F. After passing through superheater 14, the properties of the feedstock at location B are expected to be all vapor at 62 psia 340° F., which is a flow rate of 139 ACFM. The feedstock will then be fed alternatingly through first and second primary molecular sieve units 16, 18 with the duration of feedstock passage through the operative one of molecular sieve units 16, 18 being 5 minutes. The feedstock exiting the operative one of first and second primary molecular sieve units 16, 18, after passing through gas-to-gas heat exchanger 34 and arriving at location C is expected to exhibit the following properties: 15 psia, 175° F. with approx 80% being vapor, but devoid of water. It is expected that after passing through condenser 28 and through unit 32, 99.5% dry benzene will result and be furnished at a production rate of 9.6 gpm.

Regeneration of first and second primary molecular sieve units 16, 18 will be with a regeneration time for each unit of 4.5 minutes, with the regeneration gas, namely recycle nitrogen, being supplied via line 64 to regenerate first and second molecular sieve units 16, 18 at a temperature and pressure of 2 psia and 200° F., a flow rate of 1.0× the feedstock ACFM or 139 ACFM (which is only 77 pounds per hour because of the lower pressure) and is expected to be 63.3 pounds per hour nitrogen with 0.6 pounds per hour water and 13.1 pounds per hour benzene.

The regeneration gas, namely recycle $N_2$, being supplied via line 64 and through valves 60 and 62 to first and second primary molecular sieves 16, 18, is essentially the feedstock gas with respect to first and second recycle molecular sieve units 92, 94, at a flow rate of 77 pounds per hour. This feedstock passes thru first and second recycle molecular sieve units 92, 94 at 14.7 psia and 55° F. for a volumetric flow of 15.4 ACFM. Regeneration of first and second recycle molecular sieve units 92, 94 will be performed with a regeneration time for each unit being 4.5 minutes, with the regeneration gas, which may be pure nitrogen or may be dried alcohol vapors, preferably dried alcohol, being supplied via line 116, 114 to first and second recycle molecular sieve units 92, 94 at a temperature of 260° F. and pressure of 0.2 psia and flow rate of 1× feedstock volumetric rate of 15.4 ACFM or about 4 pounds per hour benzene. First and second recycle molecular sieve units 92, 94 will be alternatingly cycled in sequence with the cycling of first and second primary molecular sieve units 16, 18.

I claim the following:

1. A pressure or vacuum swing adsorption process for separating water from solvent comprising:
   a) passing a water-solvent mixture along a molecular sieve thereby permitting water to be adsorbed on the molecular sieve;
   b) capturing dewatered solvent after passage of the mixture along the molecular sieve; and
   c) regenerating the molecular sieve by passing non-condensable gas along the molecular sieve at a pressure less than about 2.0 psia to remove adsorbed water therefrom.

2. The process of claim 1 further comprising repeatedly recycling the non-condensable gas through the molecular sieve at a pressure less than about 2.0 psia.

3. A pressure or vacuum swing adsorption process for separating water from solvent comprising:
   a) passing a water-solvent mixture along a molecular sieve thereby permitting water to be adsorbed on the molecular sieve;
   b) capturing dewatered solvent after passage of the mixture along the molecular sieve. regenerating the molecular sieve by passing non-condensable gas along the molecular sieve at a pressure less than about 2.0 psia to remove adsorbed water therefrom
   c) repeatedly recycling the non-condensable gas through the molecular sieve and
   d) passing the recycled gas along a secondary molecular sieve to dry the recycled gas between regenerating passes along the first molecular sieve.

4. A pressure or vacuum swing adsorption process for separating water from solvent, comprising:
   a) passing a first portion of a water-solvent mixture along a first molecular sieve thereby permitting water to be adsorbed on a first molecular sieve and capturing remaining solvent while passing non-condensable gas along a second molecular sieve at a regeneration pressure less than about 2.0 psia to regenerate the second molecular sieve by removing adsorbed water therefrom;
   b) passing a second portion of the water-solvent mixture along the second molecular sieve thereby permitting water to be adsorbed on the surface of the second molecular sieve and capturing remaining solvent while passing non-condensable gas along the first molecular sieve at a regeneration pressure less than about 2.0 psia to regenerate the first molecular sieve by removing adsorbed water therefrom.

5. The process of claim 4 further comprising recirculating the non-condensable recycle gas along the first and second molecular sieves in the course of sequentially repeating steps "a" and "b".

6. The method of claim 4 wherein the solvent is an alcohol.

7. The method of claim 4 wherein the solvent is selected from the group comprising isopropyl alcohol, ethanol, methanol, acetate, acetone and benzene.

8. A pressure or vacuum swing adsorption process for separating water from solvent, comprising:
   a) passing a first portion of a water-solvent mixture along a first molecular sieve thereby permitting water to be adsorbed on a first molecular sieve and capturing remaining solvent while passing non-condensable gas along a second molecular sieve at a regeneration pressure less than about 2.0 psia to regenerate the second molecular sieve by removing adsorbed water therefrom;
   b) passing a second portion of the water-solvent mixture along the second molecular sieve thereby permitting water to be adsorbed on the surface of the second molecular sieve and capturing remaining solvent while passing non-condensable gas along the first molecular sieve at a regeneration pressure less than about 2.0 psia to regenerate the first molecular sieve by removing adsorbed water therefrom;
   c) recirculating the non-condensable recycle gas along the first and second molecular sieves in the course of sequentially repeating steps "a" and "b"; and
   d) passing the non-condensable recycle gas along alternatingly selected ones of third and fourth molecular sieves to dry the recycle gas, while regenerating the remaining one of the third and fourth molecular sieves, prior to recirculation of the recycle gas along the first and second molecular sieves in the course of sequentially repeating steps "a" and "b".

9. A pressure or vacuum swing adsorption process for separating water from solvent, including:
   a) passing a first portion of a heated vaporized water-solvent mixture along a first molecular sieve and capturing remaining dried solvent while passing non-condensable recycle gas along a second molecular sieve at a regeneration pressure less than about 2.0 psia to regenerate the second molecular sieve by removing adsorbed water therefrom;
   b) passing a second portion of the heated vaporized water-solvent mixture along the second molecular sieve and capturing remaining vaporized dried solvent while passing non-condensable recycle gas along the first molecular sieve at a regeneration pressure less than about 2.0 psia to regenerate the first molecular sieve by removing adsorbed water therefrom;
c) passing non-condensable recycle gas along an alternatingly selected one of third and fourth molecular sieves to dry the recycle gas, while regenerating the remaining one of the third and fourth molecular sieves, prior to recirculation of the recycle gas along the first and second molecular sieves in the course of sequentially repeating steps "a" and "b".

10. In a pressure or vacuum swing adsorption process for separating water from solvent, including:
a) vaporizing a water-solvent mixture;
b) heating the vaporized mixture;
c) passing the heated vaporized mixture in a first direction through a vessel containing a molecular sieve;
d) exposing the mixture to the molecular sieve thereby permitting water to be adsorbed on the surface of the molecular sieve;
e) capturing remaining solvent outside the vessel after passage of the mixture along the surface of the molecular sieve within the vessel;

the improvement comprising regenerating the molecular sieve by:
i) passing a non-condensable recycle gas along the molecular sieve, in a direction opposite the first direction, at a regeneration pressure less than about 2.0 psia to regenerate the molecular sieve by removing adsorbed water therefrom;
ii) capturing the recycle gas, having passed along the sieve, upon exiting the vessel;
iii) pressurizing the captured recycle gas to approximately atmospheric pressure;
iv) altering the temperature, pressure, or both of the captured gas sufficiently to remove water therefrom;
v) further drying the captured recycle gas by passing it through a secondary set of molecular sieves;
vi) heating the captured recycle gas using a portion of the vaporized solvent from the vessel;
vii) expanding the heated captured recycle gas to the regeneration pressure; and
viii) repeating regeneration of the molecular sieve when and as needed by performing steps i through vii.

\* \* \* \* \*